United States Patent [19]

Ishikawa

[11] Patent Number: 5,537,391
[45] Date of Patent: Jul. 16, 1996

[54] EXCHANGE APPARATUS AND METHOD FOR TESTING THE SAME

[75] Inventor: Masahisa Ishikawa, Sendai, Japan

[73] Assignee: Fujitsu Limited, Kanagawa, Japan

[21] Appl. No.: 491,353

[22] Filed: Jun. 30, 1995

[30] Foreign Application Priority Data

Oct. 31, 1994 [JP] Japan ................................. 6-267767

[51] Int. Cl.$^6$ ................................................ H04L 12/26
[52] U.S. Cl. ............................................. 370/13; 370/15
[58] Field of Search .............................. 370/13, 16, 16.1, 370/15, 17; 371/20.1, 20.4, 20.5

[56] References Cited

U.S. PATENT DOCUMENTS

| | | | |
|---|---|---|---|
| 5,157,665 | 10/1992 | Fakhraie-Fard et al. ................. | 370/13 |
| 5,390,183 | 2/1995 | Friedrich et al. ......................... | 370/15 |

FOREIGN PATENT DOCUMENTS 4-51641  2/1992  Japan .

Primary Examiner—Wellington Chin

[57] ABSTRACT

The present invention relates to an exchange apparatus and a method for testing an exchange apparatus. The exchange apparatus includes layer 1 process normality confirming means for confirming the normality of a layer 1 process to the digital terminals by the exchange while the connecting means interconnects physically the terminals; the exchange having layer 2 logical link establishing means for inversely controlling command/response information during a logical link setting request after confirming the normality of layer 1 process to the digital terminals in the exchange, and then for establishing a layer 2 logical link in the exchange in a loop-back state. The object is to test comprehensively an exchange apparatus including the layer 1 to layer 3 processes of the primary rate interface without actually connecting the primary rate interface subscriber device.

10 Claims, 15 Drawing Sheets

F I G. 15

| DIRECTION | | COMMAND | RESPONSE | |
|---|---|---|---|---|
| PRIMARY RATE INTERFACE | → OFFICE EXCHANGE | 0 | 1 | ⇐ 11 |
| OFFICE EXCHANGE | → PRIMARY RATE INTERFACE | 1 | 0 | ⇐ 12 |

EXCHANGE APPARATUS AND METHOD FOR TESTING THE SAME

BACKGROUND OF THE INVENTION

1) Field of the Invention

The present invention relates to an exchange apparatus and a method for testing an exchange apparatus.

2) Description of the Related Art

Generally, the ISDN (integrated Services Digital Network) subscriber interface consists of a B-channel for transferring user information and a D channel for transferring a line exchange signal to control the B-channel. For example, in the case of a 1.5 Mbps primary rate interface subscriber, the ISDN subscriber interface is formed of 23 B-channels and a D channel.

The 23 B-channels are controlled by exchanging a call process signal called a layer 3 message between an office exchange and a primary rate interface subscriber in the D-channel. In order to pass the layer 3 message through the D-channel, it is essential that the logical links of a layer 1 and a layer 2, each being lower than that of the layer 3, are in an established state.

The logical link of the layer 2 is formed by connecting a primary rate interface subscriber with an office exchange by means of hardware, synchronizing with the electrical signal frame of the layer 1, and then implementing the logical link establishing procedure shown in FIG. 12. That is, a setting request "SABME (set asynchronous balanced mode extended)" message in a multiframe mode is first transmitted from the office exchange to a primary rate interface subscriber (step A1). Then the primary rate interface subscriber received the setting request "SABME" sends back a "UA (unnumbered acknowledge)" message as an acknowledge to "SABME" to the office exchange (step A2).

In other words, when an office exchange can receive an acknowledge "UA" message to the "SABME" message, a layer 2 logical link can be established between the office exchange and the primary rate interface subscriber.

The layer 2 logical link which has been once established between the office exchange and the primary rate interface subscriber is regulated so as to maintain always its establishment state. The establishment is confirmed by transmitting and receiving a monitor frame between the office exchange and the primary rate interface subscriber.

The "SABME" message has the data configuration shown in FIG. 13. The "UA" message has the data configuration shown in FIG. 14. In FIGS. 13 and 14, the SAPI (service access point identifier) of the octet 2 is data representing the type of the service point provided by the layer 2. For example, "0" defines a call control signal service point of a layer 3. "16" defines a packet data service point.

C/R (command/response) bit is data which is defined as a command when a special request is requested to a frame receiving side or as a response when an acknowledgment is sent to the special request. The C/R bit, for example, is shown in FIG. 15.

That is, since the "SABME" message is a logical link setting request (command) sent from an office exchange to a primary rate interface subscriber, the C/R bit is set to "1". message is an acknowledgment (response) sent from a primary rate interface subscriber to an office exchange, the C/R bit is set to "1". This definition accords with the standard convention ruled by ITU-T.

"EA" of the octet 2 is data called an address field extension bit. For example, "0" means that the data follows a next octet and "1" means that the octet is the final octet.

"TEI (terminal endpoint identifier)" of the octet 3 represents a terminal identifier. "P/F (poll/final)" bit of the octet 4 is data used as a poll bit in the case of command and as a final bit in the case of response. Hence, in the case where the "SABME" message is a command, the data represents a poll bit. As to the P/F bit, "1" is set similarly to the final bit of a response to a command of "poll bit=1".

In the octets 5 and 6, "FCS (flame check sequence)" is data for detecting data transmission errors.

After the layer 2 logical link becomes an establishment state as a result of an exchange of the "SABME" message and the "UA" message, transmitting and receiving the layer 3 message between the office exchange and the primary rate interface allows the B-channel signal path for transfering user information such as voice to be established or released.

By referring to FIG. 16, explanation will be made here as to the layer 3 message transmission and reception including, for example, a normal process ranging from an establishment of a voice signal path in the B-channel to a release.

First, when a primary rate interface subscriber on the originating side originates a call, SETUP (call setting request) message is sent to a primary rate interface subscriber on the designation side (step B1). Then CALLPROC (call proceeding: call setting) message is transmitted from the office exchange to the primary rate interface subscriber on the originating side (step B2).

Thereafter, when calling the primary rate interface subscriber on the designation side starts, ALERT (alerting: called party calling) message is transmitted to the primary rate interface subscriber through the office exchange (step B3). When the destination side responds to the calling, CONN (connect: called party's response) message is transmitted from the destination side to the originating side through the office exchange (step B4) so that a channel (in this case, the B-channel) is connected to begin communications. At this time, the office exchange is sending the CONNACK (connect acknowledge) message representing a complete connection between the originating side and the destination side to the destination side (step B5).

Next, at the end of the communications, a DISC (disconnect: call disconnection request) is transmitted from the destination side to the originating side through the office exchange (step B6) so that a channel disconnection and a call number are released. Then a REL (release: channel disconnection completion and a call number release request) message is transmitted from the originating side to the destination side (step B7). When the REL message is received on the destination side, RELCOM (release complete: channel release completion report and call number release request) message representing the release completion is transmitted to the originating side (step B8).

At this time, a selection of the B-channel used is decided by transmitting and receiving the layer 3 message. On the office exchange side, B-channels are searched for an empty channel from lower or higher number in order. Then an empty B-channel (not being used) number first found is designated.

In the general B-channel test of a primary rate interface subscriber, as shown in FIG. 17, a loop-back connection of the office exchange 20A and primary rate interfaces 30A and 40A is made by a switching operation at the primary rate interfaces (digital terminals) 30A and 40A each called a digital terminal (DT). The layer 1 is first established by judging the usable state of the hardware B-channel, based on the defect state of a signal returned to the office exchange due to electrical current flowing through the loop-back connection.

Thereafter, communication confirmation is made between the telephone terminals 7A-1 to 7A-N and telephone terminals 8A-1 to 8A-N (N is a natural number), by actually connecting the primary rate interface subscriber devices 50A and 60A to each other. Thus the logical links of the layer 2 and the layer 3 are established to perform the B-channel test of the primary rate interface subscriber.

Instead of telephone terminals 7A-1 to 7A-N and 8A-1 to 8A-N shown in FIG. 17, Japanese Patent Application Laid-Open (Kokai) Patent No. HEI 4-51641 discloses a technology in which testing is made by preparing two conventional analog dummy call devices and then by making all B-channels over the primary rate interface subscriber in use state to obtain a heavy load.

However, such a general testing method has a disadvantage in that if the primary rate interface subscriber (hereinafter sometimes merely referred to as a subscriber) is not actually connected after an establishment of the layer 1, a comprehensive call processing test including the layers 2 and 3 of the primary rate interface cannot be performed so that expensive primary rate interface subscriber devices must be prepared by the number of subscribers when plural primary rate interface subscribers want simultaneously a call process test.

Furthermore, it is general that a new function is being developed even on the primary rate interface subscriber side during a development of a new function on the office exchange side. Hence, there is a disadvantage in that it is difficult that a subscriber is actually connected to execute a call process test.

Where an operation begins by connecting newly a primary rate interface subscriber to an exchange, if an abnormal communication state should occur, in spite of a normal hardware connection (an establishment of layer 1), it is difficult to specify which of the primary rate interface subscriber side and office exchange side causes the abnormal state. Hence, there is a disadvantage in that much time consumed for an abnormal cause analysis leads to a poor service.

Moreover, according to the testing method described in the Japanese Patent Application Laid-open (Kokai) No. HEI 4-51641, a load test must be performed to all B-channels of primary rate interface subscribers. Hence, there is a disadvantage in that a specific B-channel selected cannot be tested.

SUMMARY OF THE INVENTION

The present invention is made to overcome the above mentioned problems. An object of the present invention is to provide an exchange apparatus that can comprehensively test an exchange including a layer 1 process to a layer 3 process in a primary rate interface, without actually connecting a primary rate interface subscriber device.

Another object of the present invention is to provide the exchange apparatus testing method that can comprehensively test an exchange including a layer 1 process to a layer 3 process in a primary rate interface, without actually connecting a primary rate interface subscriber device.

In order to achieve the above objects, according to the present invention, the exchange apparatus including an exchange and two digital terminals connected to the exchange, is characterized by connecting means for physically interconnecting the digital terminals; and layer 1 process normality confirming means for confirming the normality of a layer 1 process to the digital terminals by the exchange while the connecting means interconnects physically the digital terminals; the exchange including layer 2 logical link establishing means for inversely controlling command/response information during a logical link setting request after the layer 1 process normality confirming means has confirmed the normality of layer 1 process to the digital terminals by the exchange, and then for establishing a layer 2 logical link in the exchange, with the digital terminals physically connected in a loop-back state.

Therefore, according to the exchange apparatus of the present invention, before the subscriber device is connected to the digital terminal, the normality of the process in an exchange apparatus can be previously confirmed by performing a series of process test of the layer 1 process and layer 2 logical link. Thus there is an advantage in that the reliability of the process in the exchange apparatus can be greatly improved.

According to the present invention, the exchange apparatus testing method that tests an exchange system including an exchange and two digital terminals connected to the exchange, is characterized by the steps of confirming the normality of a layer 1 process to digital terminals in the exchange, with the digital terminals physically interconnected; then subjecting command/response information during a logical link setting request to a reverse control; And establishing a layer 2 logical link in the exchange, with the digital terminals physically interconnected in a loop-back state, whereby the exchange apparatus is tested.

Therefore, according to the exchange apparatus testing method of the present invention, before the subscriber device is connected to the digital terminal, the normality of the process in an exchange apparatus can be previously confirmed by performing a series of process test of the layer 1 process and layer 2 logical link without actually connecting the subscriber device connected to the digital terminal. Thus there is an advantage in that the reliability of the process in the exchange apparatus can be greatly improved.

BRIEF DESCRIPTION OF THE DRAWINGS

FIG. I is a block diagram showing An aspect of the present invention;

FIG. 15 is a diagram used for explaining the definition of the C/R bit in SABME or UA message data;

DESCRIPTION OF THE PREFERRED EMBODIMENTS (a) Aspect of the Invention:

By referring to the attached drawings, explanation will be made as for an aspect of the present invention.

Figure 1:
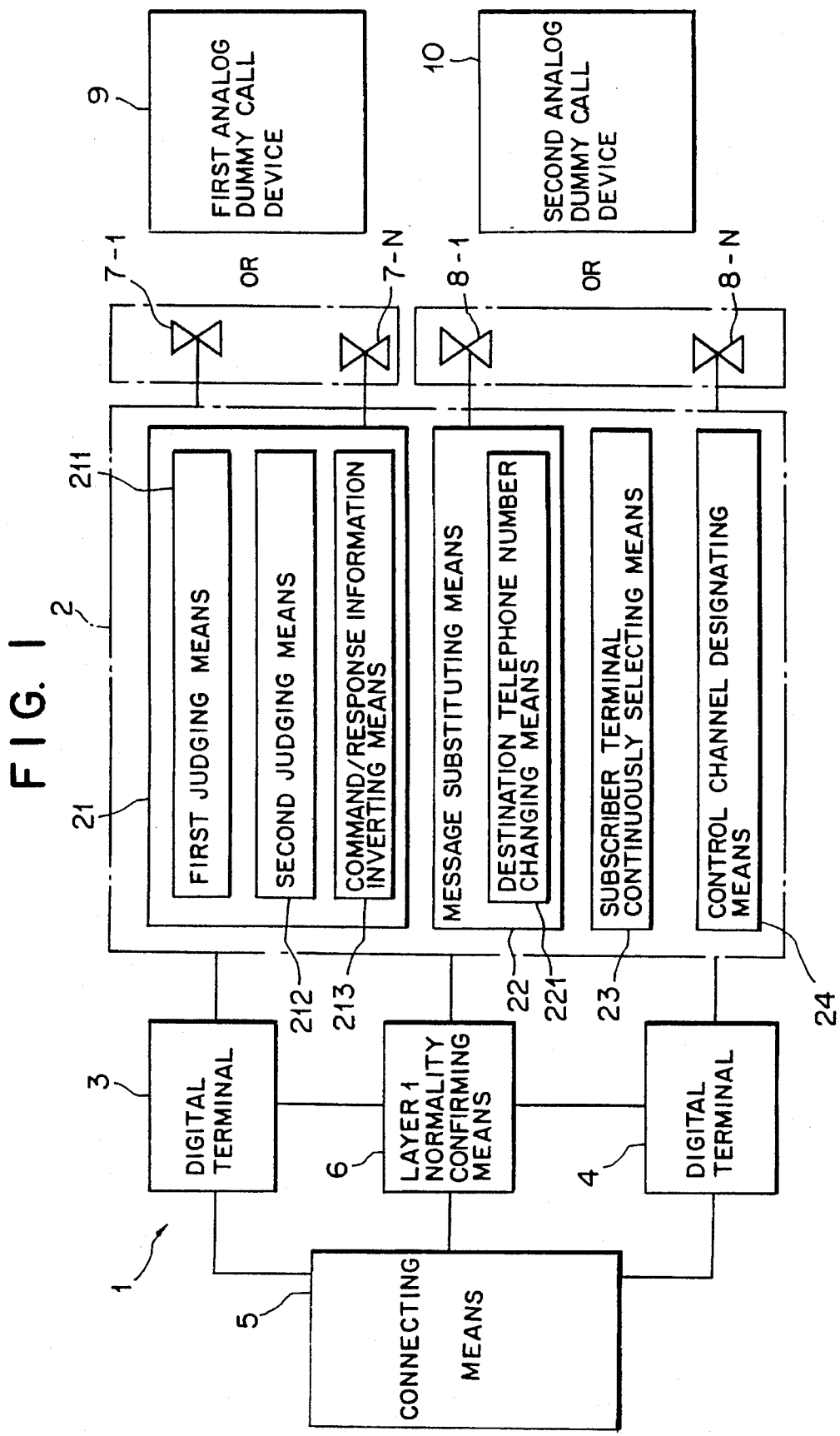

FIG. 1 is a block diagram showing an aspect of the present invention. Referring to FIG. 1, an exchange apparatus 1 includes an exchange 2, two digital terminals 3 and 4 connected to the exchange 2, connecting means 5, and layer 1 process normality confirming means 6.

The connecting means 5 connects physically the digital terminal 3 with the digital terminal 4. The layer 1 process normality confirming means 6 confirms the layer 1 process normality to the digital terminals 3 and 4 by the exchange 2, with the connecting means 5 physically interconnecting the digital terminals 3 and 4.

The exchange 2 includes layer 2 logical link establishing means 21, message substituting means 22, subscriber continuously selecting means 23, and control channel designating means 24.

The layer 2 logical link establishing means 21 controls reversely the command/response information during a logical link setting request after the layer 1 process normality confirming means 6 has confirmed the normality of the layer 1 process to the digital terminals 3 and 4 of the exchange 2, thus establishing a layer 2 logical link in the exchange 2 in a loop-back state where the digital terminal 3 is physically connected to the digital terminal 4.

In such a manner, in the exchange apparatus 1 according to the present invention, while the connecting means 5 connects physically the digital terminal 3 to the digital terminal 4, the layer 2 logical link establishing means 21 controls inversely command/response information during a logical link setting request after the layer 1 normality confirming means 6 has confirmed the normality of the layer 1 process to the digital terminals 3 and 4 by the exchange 2. As a result, the exchange apparatus can be tested by establishing the layer 2 logical link in the exchange 2, with the physical connection in a loop-back state formed between the digital terminals 3 and 4.

According to the exchange apparatus 1 and the testing method of the exchange apparatus 1, a series of process test of a layer 1 process and a layer 2 logical link are performed, with no subscriber device actually connected to the digital terminals 3 and 4, so that the process normality of the exchange apparatus 1 can be previously confirmed before the subscriber device is connected to the digital terminals 3 and 4. Hence there is an advantage in that the process reliability of the exchange apparatus 1 can be greatly improved.

The layer 2 logical link establishing means 21 also includes first judging means 211, second judging means 212, and command/response information inverting means 213.

The first judging means 211 judges whether the layer 1 process normality confirming means 6 has confirmed the normality of the layer 1 process to the digital terminals 3 and 4 of the exchange 2. The second judging means 212 judges whether the loop-back state is established based on the information defined in the subscriber data after the normality of the layer 1 process has been confirmed by the first judging means 211. The command/response information inverting means 213 inverts command/response information during a logical link setting request when the second judging means 212 judges the loop-back state.

In the layer 2 logical link establishing means 21, the first judging means 211 judges whether the normality of the layer 1 process to the digital terminals 3 and 4 by the exchange 2 has confirmed. The second judging means 212 judges whether the normality of the layer 1 process confirmed by the first judging means 211 is in the loop-back state with reference to the information defined it is in the subscriber data. When the second judging means 212 judges the loop-back state, the command/response information inverting means 213 inverts the command/response information during a logical link setting request.

Hence, according to the exchange apparatus of the present invention, the exchange apparatus 1 can be easily tested without actually connecting the subscriber device to the digital terminals, by inverting the command/response information during the logical link setting request.

The message substituting means 22 substitutes a destination message sent from the digital terminal 3 into an originating message. The message substituting means 22 includes destination telephone number changing means 221 that changes a destination telephone number.

In the exchange 2, the message substituting means 22 can be substituted destination messages sent from the digital terminals 3 and 4 into an originating message after an establishment of the layer 2 logical link. In concrete, the message substitution is made by changing a destination telephone number by the destination telephone number changing means 221.

Hence, even if the physical connection between the digital terminals 3 and 4 makes a loop-back state, the exchange apparatus 1 can be easily examined after an establishment of the layer 2 logical link.

When the exchange 2 is connected to the first analog dummy call device 9 that has functions of plural analog originating subscriber terminals 7-1 to 7-N and the second analog dummy call device 10 that has functions of plural analog destination subscriber terminals 8-1 to 8-N, the subscriber continuously selecting means 23 selects continuously plural analog originating subscriber terminals 7-1 to 7-N and plural analog destination subscriber terminals 8-1 to 8-N.

Where the exchange 2 is connected to the first analog dummy call device 9 that has functions of the plural analog originating subscriber terminals 7-1 to 7-N and the second analog dummy call device 10 that has the functions of the plural analog destination subscriber terminals 8-1 to 8-N, the subscriber continuously selecting means 23 selects continuously the analog originating subscriber terminals 7-1 to 7-N and the analog destination subscriber terminals 8-1 to 8-N. As a result, the exchange apparatus 1 can be tested using the first analog dummy call device 9 and the second analog dummy call device 10.

Therefore, the first analog dummy call device 9 can implement a call load test of plural analog originating subscriber terminals 7-1 to 7-N. The second analog dummy call device 10 can implement a call load test of plural analog destination subscriber terminals 8-1 to 8-N. A call load test for an analog call process and a digital call process can be performed at the same time. As a result, the exchange apparatus can be tested very economically and efficiently.

The control channel designating means 24 can designate a use control channel when an originating/destination call is created.

Hence, for example, where a congestion state occurs in the exchange 2, the control channel designating means 24 designates a control channel to regulate an originating call and a destination call.

Figure 2:
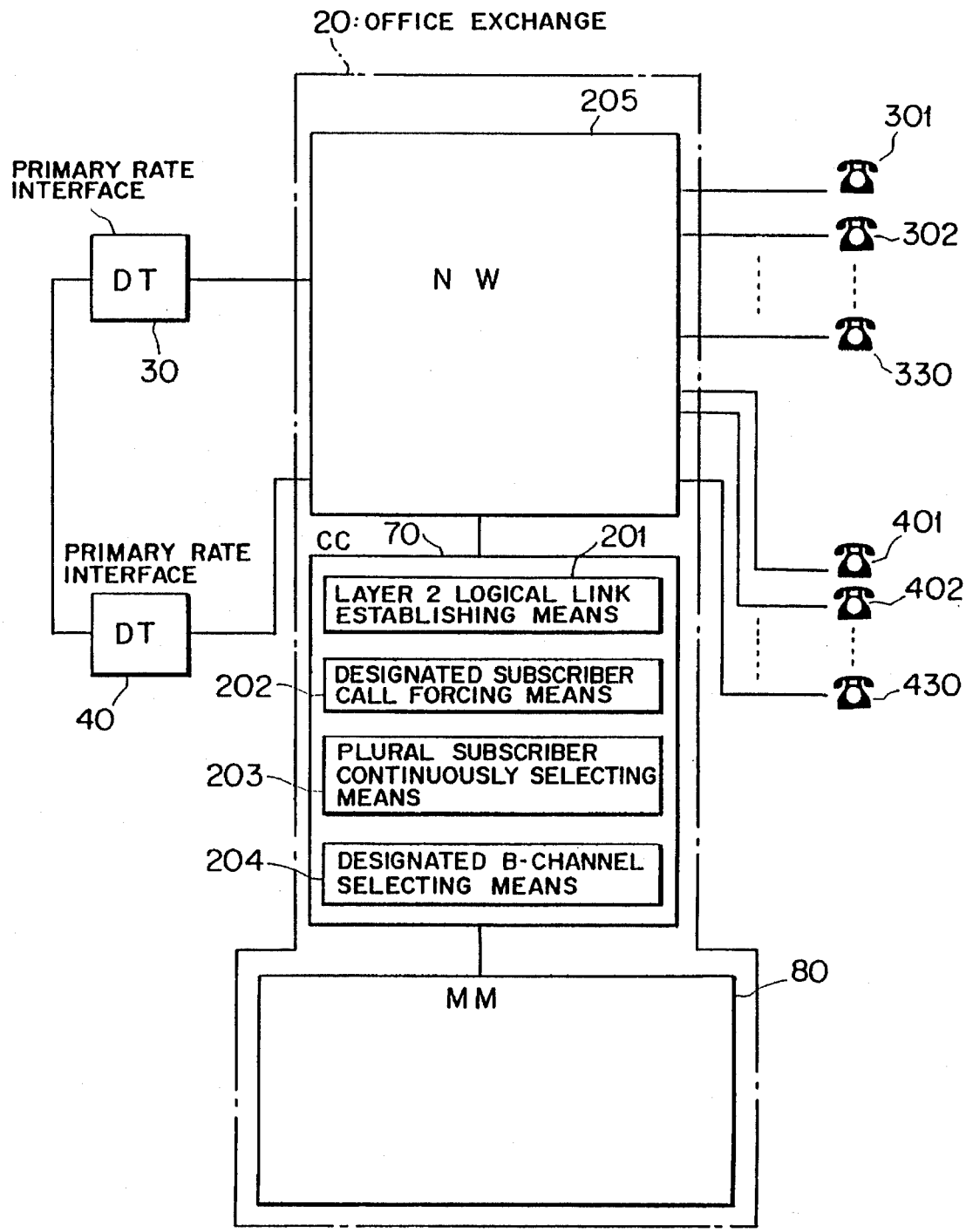
FIG. 2 is a block diagram showing the configuration of an exchange apparatus according to the first embodiment of the present invention.

(b) First Embodiment of the Present Invention:

FIG. 2 is a block diagram showing the configuration of an exchange apparatus according to the first embodiment of the present invention. Referring to FIG. 2, the exchange apparatus consists of an office exchange (exchange) 20 and two primary rate interfaces (DT: digital terminals) 30 and 40 each connected to the office exchange 20.

As shown in FIG. 2, the office exchange 20 is connected by connecting in hardware form (physically) the first primary rate interface 30 to the second primary rate interface 40 via a signal line (connecting means) to connect two primary rate interfaces 30 and 40 in a loop-back state.

The office exchange 20 includes in hardware aspect a call path (NW: network) 205, a central processing unit (CC) 70, and a main storage unit (MM) 80. However, in terms of the function in the present embodiment, the office exchange 20 includes layer 2 logical link establishing means 201, designated subscriber call forcing means 202, plural subscriber continuously selecting means 203, and designated B-channel selecting means 204.

The layer 2 logical link establishing means 201 controls inversely a CfR bit (command/response information) during a logical link setting request after the normality of the layer 1 process to the primary rate interfaces 30 and 40 of the office exchange has been confirmed, and establishes the layer 2 logical link in the office exchange 20 in a loop-back state where the first primary rate interface 30 and the second primary rate interface 40 are connected in hardware form.

The layer 2 logical link establishing means 201 includes a layer 2 management unit (not shown in FIG. 2). The layer 2 management unit will be described later in detail.

The designation subscriber call forcing means (message substituting means and destination telephone number changing means) 202 substitutes a destination message sent from the primary rate interface 30 (or 40) into an originating message from the primary rate interface 40 after the layer 2 logical link establishing means 201 has established a layer 2 logical link and then changes the destination telephone number, thus making forcibly an originating call from the analog subscriber terminal 301 send to an analog subscriber 430.

Plural subscriber continuously selecting means (subscriber terminal continuously selecting means) 203 selects continuously an analog subscriber terminal to be tested when two analog dummy call devices (not shown) to be described in the second embodiment is connected instead of analog subscriber terminals 301 to 330 and 401 to 430.

Moreover the designation B-channel selecting means (control channel designating means) 204 designates the B-channel (control channel) used for making an originating or a destination call between the analog subscriber terminal 301 and the analog subscriber terminal 401.

The procedure of the B-channel testing in the exchange apparatus having the above-mentioned configuration will be described below. The test procedures, in which plural subscriber continuously selecting means 203 and the designation B-channel selecting means 204 are used, will be described later in the second embodiment.

Figure 3A:
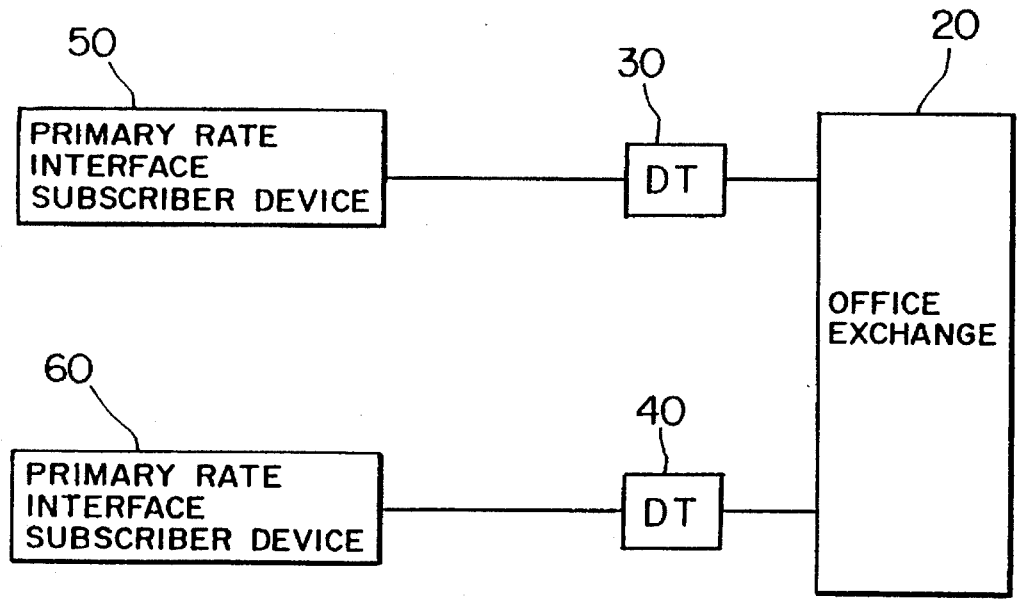
FIGS. 3(a) and FIG. 3(b) are diagrams each used for explaining a procedure of confirming the normality of the layer 1 process in an exchange apparatus according to the first embodiment of the present embodiment.
Figure 3B:
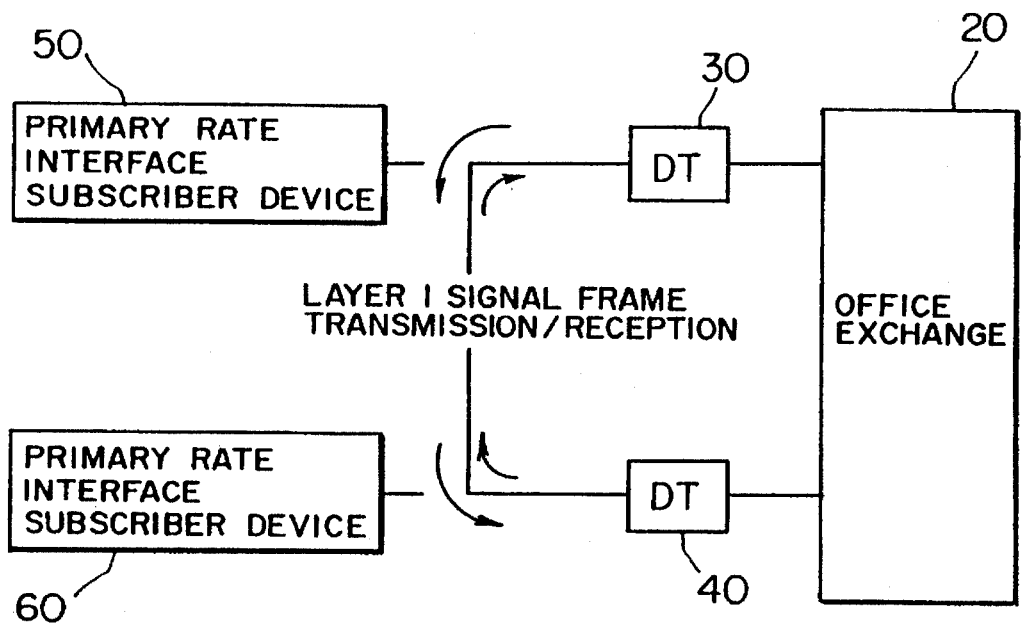

(b 1) Procedure for Confirming the Normality of Layer 1 Process:

As shown in FIG. 3(*a*), the office exchange 20 is connected in hardware form to the primary rate interface subscriber device 50 via the primary rate interface (DT) 30 and to the primary rate interface subscriber device 60 via the primary rate interface (DT) 40. In order to make a synchronization with a layer 1, the two primary rate interfaces 30 and 40 are connected in hardware form to conduct electrical signals, as shown in FIG. 3(*b*).

Since the electrical signal frame of the layer 1 has no directivity (the direction extending from the office exchange 20 to the primary rate interface 30 (40) or from the primary rate interface 30 (40) to the office exchange 20), the process for establishing a synchronous operation by connecting the primary rate interface subscriber devices 50 and 60 to the office exchange 20, as shown in FIG. 3(*a*), and the process, as shown in FIG. 3(*b*), for establishing a synchronous operation by interconnecting the office exchanges 20 can be performed similarly.

Hence, with the primary rate interfaces 30 and 40 operate normally, the layer 1 can be synchronized even if the office exchange 20 is interconnected, as shown in FIGS. 2 or 3(*b*), by connecting the primary rate interfaces 30 and 40 in a loop-back state by means of only hardware, whereby the normality of the layer 1 process can be first confirmed.

The layer 1 process can be confirmed by the layer 1 process normality confirming means (not shown in FIG. 2) that confirms the normality of the layer 1 process to the primary rate interfaces 30 and 40 of the exchange 20, with the primary rate interfaces 30 and 40 connected to each other in hardware form.

(b2) Procedure for Establishing the Layer 2 Logical Link in the Exchange 20:

As described above, the office exchanges 20 are connected together, with the primary rate interfaces 30 and 40 connected in a loop-back form, to confirm the normality of the layer 1 process. Then the layer 2 logical link cannot be established without any change because the frame data of the layer 2 logical link has a directivity directed from the primary rate interface 30 (40) to the office exchange 20 or from the office exchange 20 to the primary rate interface 30 (40), as described with FIG. 15.

The C/R bit (command/response information) being data managing the directivity is defined as described with FIG. 15. When the office exchange 20 transmits data to the primary rate interface subscriber device 50 (60) (refer to FIG. 3(b)), the C/R bit is set based on the definition shown with numeral 12 in FIG. 15. When the office exchange 20 receives data from the primary rate interface subscriber device 50 (60), it is judged whether the data is a command or response based on the definition shown with numeral 11 in FIG. 15. On contrary, when the primary rate interface subscriber device 50 (60) transmits data to the office exchange 20, the C/R bit is set based on the definition shown with numeral 11 in FIG. 15. When the primary rate interface device 50 (60) receives data from the office exchange 20, it is judged whether the data is a command or response based on the definition shown with numeral 12 in FIG. 15.

In other words, the convention of the C/R bit in the office exchange 20 is regulated oppositely to that in the primary rate interface subscriber device 50 (60). The office exchange 20 provides only the functions according to the regulation for the office exchange 20. Hence, even if the office exchange 20 is connected, with the primary rate interfaces 30 and 40 connected in a loop-back state, the layer 2 logical link cannot be established.

When there is a loop-back test request by a command for maintenance of the office exchange 20, the layer 2 logical link can be established by controlling inversely the C/R bit and resetting the definition of the C/R bit from the viewpoint of the primary rate interface subscriber devices 50 and 60.

That is, with the primary interfaces 30 and 40 physically connected, after the normality of the layer 1 process of the office exchange 20 to the primary rate interfaces 30 and 40 is confirmed, the layer 2 logical link establishing means 201 controls inversely the C/R bit (command/response information) in data during a layer 2 logical link setting request. As a result, the layer 2 logical link can be established in the office exchange 20 in a loop-back state in which the primary rate interface 30 is physically connected to the primary rate interface 40.

Figure 4:
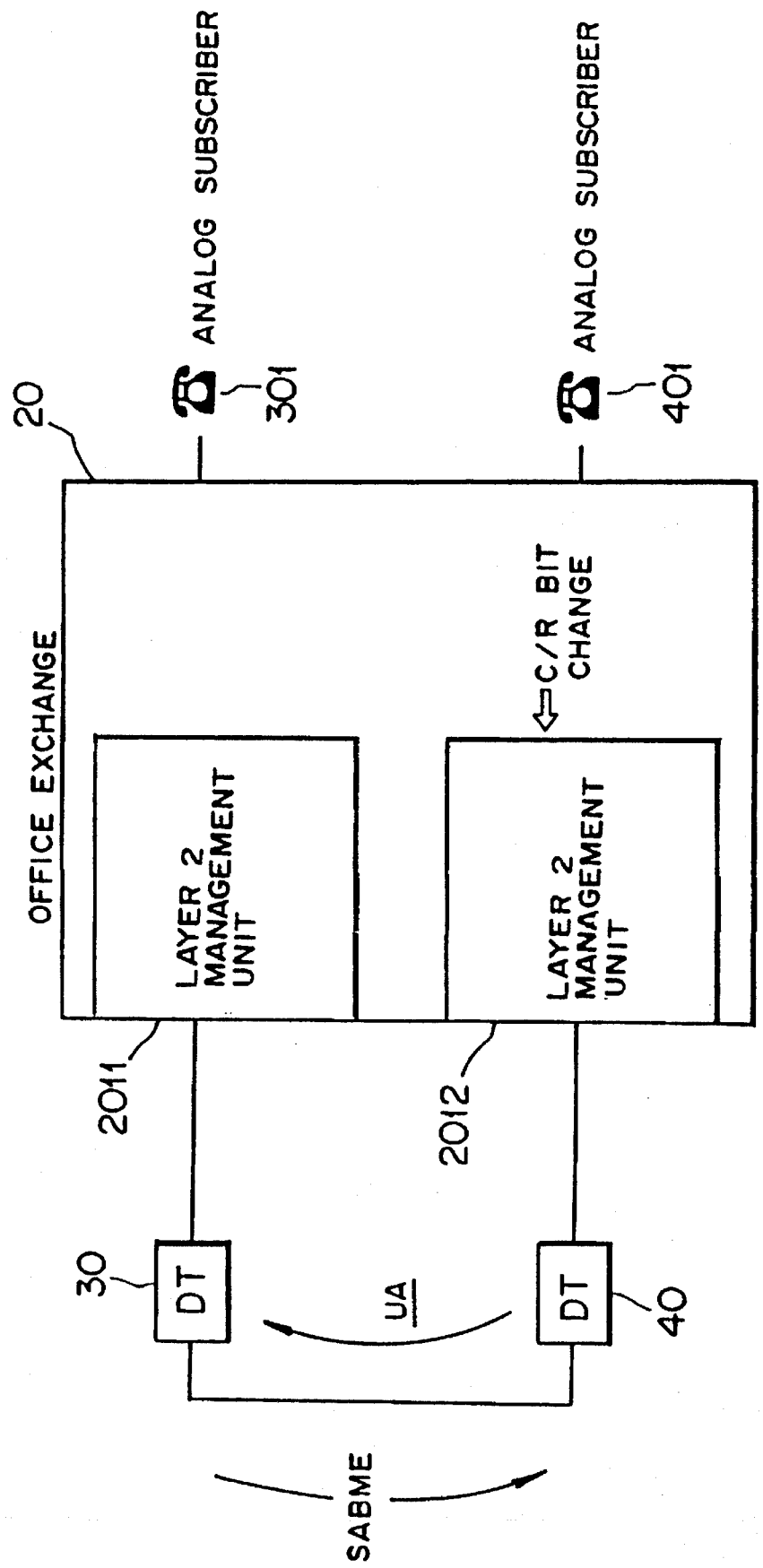
FIG. 4 is a diagram used for explaining a procedure of establishing the layer 2 logical link in an exchange apparatus according to the first embodiment of the present invention.

In concrete, as shown in FIG. 4, in the layer 2 management unit 2011 in the office exchange 20, data identifying a dummy primary rate interface subscriber is newly added to data defining a service content provided to each subscriber called subscriber data among data on the "SABME" message transmitted from the office exchange 20 when a layer 2 logic link is established, whereby the SABME message is transmitted from the layer 2 management unit 2011 to the layer 2 management unit 2012.

The layer 2 management unit 2012 establishes the layer 2 logical link by controlling inversely a C/R bit of the acknowledgment response UA in the SABME message and then changing the definition into the direction in which data is sent from the primary rate interface device to the office exchange. As a result, it is possible to transmit and receive the layer 2 frame. Each of the layer 2 management units 2011 and 2012 is included in layer 2 logical link establishing means 201.

Figure 5:
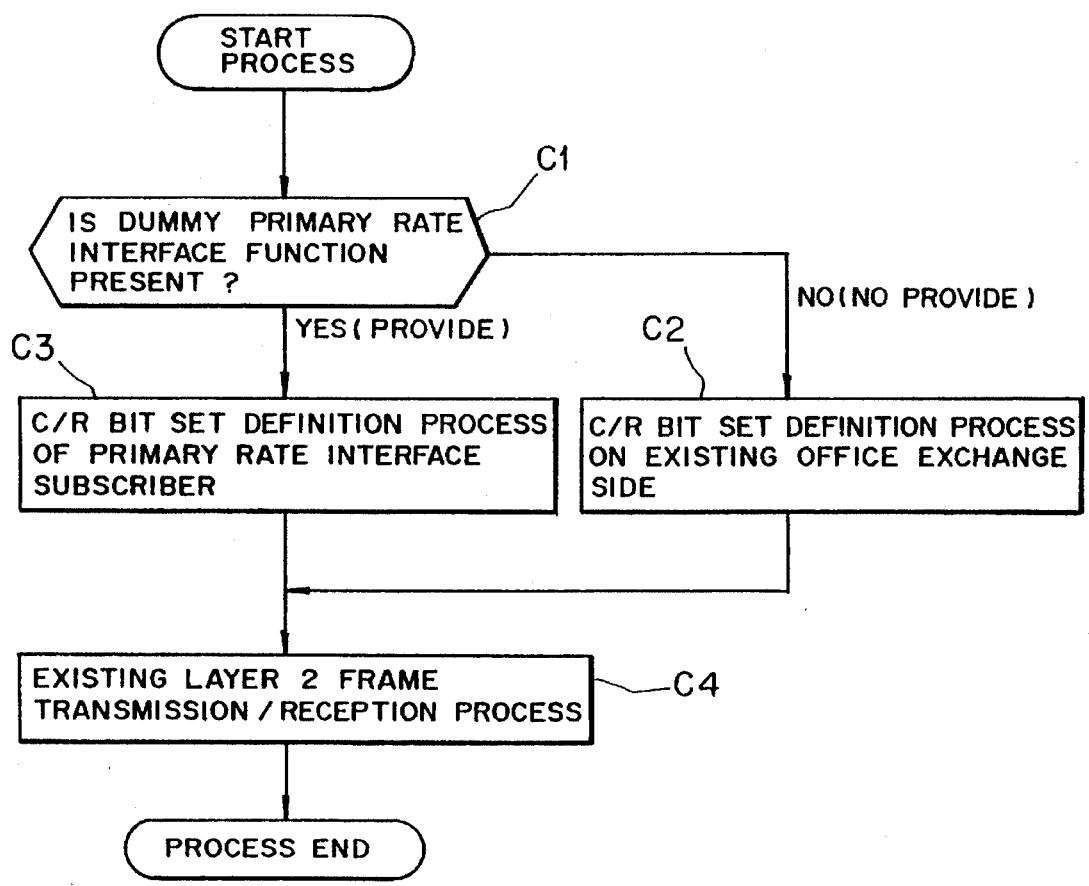
FIG. 5 is a flowchart used for explaining a procedure of establishing the layer 2 logical link in an exchange apparatus according to the first embodiment of the present embodiment.

FIG. 5 shows a flowchart showing a process in the layer 2 management unit 2012. That is, the layer 2 management unit 2011 in an office exchange checks whether "dummy primary rate interface subscriber function provided" based on data of a SABME message transmitted from the layer 2 management unit 2011 (step C1).

As a result, if "dummy primary rate interface subscriber function not provided" is checked, the flow goes to NO route in the step C1. Like the conventional way, C/R bit is set based on the definition made on the exchange side (step C2).

0n contrary, if "dummy primary rate interface subscriber function provided" is checked, the definition of the C/R bit in acknowledgment response "UA" data is inverted and changed "from primary rate interface to office exchange"(step C3). Thereafter, like the conventional way, the process of transmitting and receiving the frame of the layer 2 is performed (step C4).

In other words, after the normality of the layer 1 process is confirmed, it is judged whether the loop-back state in which the primary rate interfaces 30 and 40 are connected in hardware form has been established, based on information defined in subscriber data. If it is decided that a loop-back state is established, the layer 2 management unit 2011 (2012) in the layer 2 logical establishing means 201 inverts the C/R bit during a logical link setting request. The layer 2 management unit 2011 (2012) acts as first judging means that judges whether the normality of the layer 1 process has been confirmed, second judging means that judges whether the loop-back state has been established based on information defined in subscriber data after the normality of the layer 1 process has been confirmed, and command/response information inverting means that inverts the C/R bit during setting a logical link when it is judged that a loop-back state has been established.

Since the above-described process can change the definition of the C/R bit, the layer 2 logical link can be established even when the office exchange 20 is connected with the loop-back of the primary rate interfaces 30 and 40. Thereafter the layer 3 message can be transferred.

As described above, even if the primary rate interface subscriber device 50 (60) which is to be connected to the primary rate interface 30 (40) is not actually connected (refer to layer 2 logical link can be performed. Hence, before the primary rate interface subscriber device 50 (60) is connected to the primary rate interface 30 (40), the normality of the process in the exchange apparatus can be previously confirmed. Hence the reliability of the process of the exchange apparatus can be greatly improved.

(b3) Procedure for Establishing Call Path by Transmission/Reception of Layer 3 Message:

Next, let us explain the process that establishes a call path between subscribers by transmitting and receiving the layer 3 message after a layer 2 logical link has been established.

Figure 6:
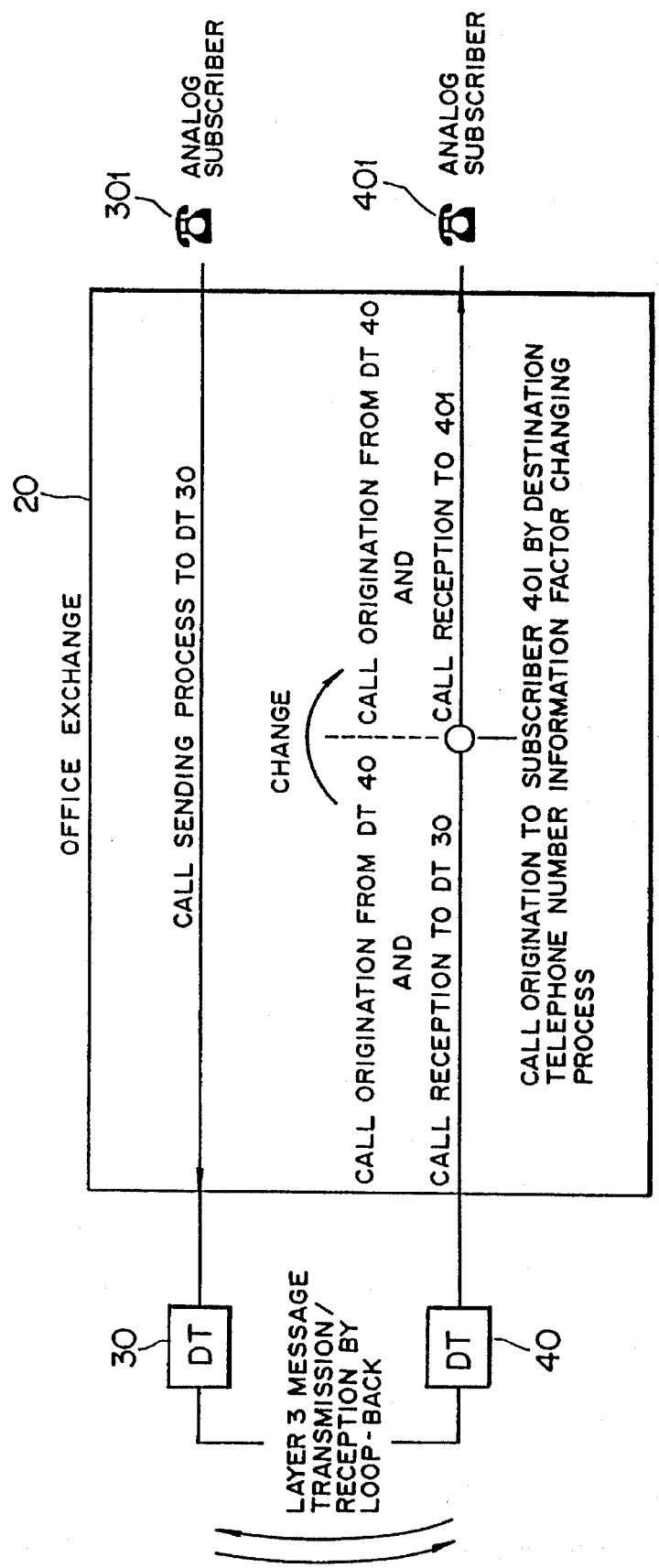
FIG. 6 is a diagram used for explaining a procedure of establishing a call path by transmission/reception of the layer 3 massage in an exchange apparatus according to the first embodiment of the present embodiment.

As shown in FIG. 6, when the analog subscriber terminal 301 originates an originating call to the primary rate interface 30, the office exchange 20 implements a series of exchanging process ranging from detecting an originating call from the analog subscriber terminal 301 to editing of layer 3 message (SETUP message) that notifies the primary rate interface 30 of call destination.

The SETUP message edited is transmitted to the primary rate interface 30. The SETUP message transmitted is received by the primary rate interface 40, with the primary rate interfaces 30 and 40 connected in a loop-back state. Moreover, the office exchange 20 recognizes that the SETUP message has been sent from the primary rate interface 30 and then implements a well-known switching process or similar process to establish a call path for a call reception.

This exchanging process is performed according to "destination number information factor" included in the SETUP message described above. Since the SETUP message "destination number information factor" designates the telephone number of the primary rate interface 30, with the primary rate interfaces 30 and 40 connected in a loop-back state, the exchange process unchanged implements a process to establish a call from the primary rate interface 40 to the primary rate interface 30. Hence, a call is directed again to the primary rate interface 30. The originating call from the primary rate interface 40 is detected because of the loopback connection between the primary rate interfaces 30 and 40. This means that an actual call path cannot be established because of a series of call origination and destination process repeated.

After an establishment of the layer 2 logical link, the designated subscriber call forcing means 202 (refer to FIG. 2) substitutes a destination message received from the primary rate interface 30 into an originating message. At this time, the SETUP message from the analog subscriber 301 can be terminated to the analog subscriber 401 by changing destination telephone number information into the telephone number of the analog subscriber terminal 401.

Figure 7:
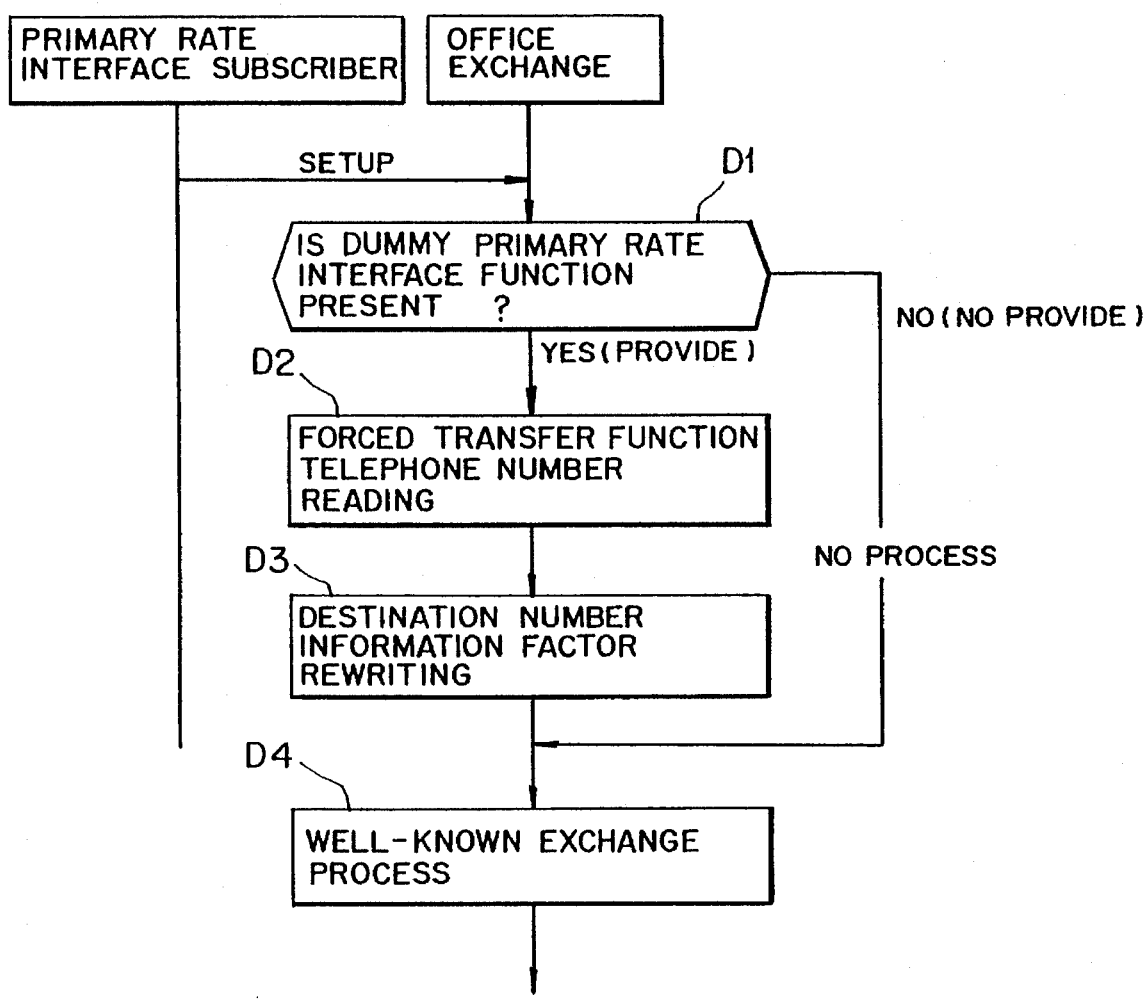
FIG. 7 is a flowchart used for explaining a procedure of establishing a call path by transmission/reception of the layer 3 massage in an exchange apparatus according to the first embodiment of the present embodiment.

FIG. 7 is a flowchart showing the above-mentioned process. When the office exchange 20 first receives the SETUP message, the dummy primary rate interface function data used at the establishment of the layer 2 logical link among the messages is referred to check whether there is a dummy primary rate interface function provide (step D1).

As a result, in the case of "dummy primary rate interface function provided" before an originating exchange process is performed to the SETUP message originated from the primary rate interface 40, the destination telephone number (in this case, the telephone number of the analog subscriber terminal 301) is read out of the "destination number information factor" included in the SETUP message (from the step D1 to the step D2 via the YES route). Then the destination telephone number is changed by forcibly rewriting to the telephone number of the analog subscriber terminal 401 (step D3). Thereafter, a well-known exchange process is implemented (step D4).

If "dummy primary rate interface subscriber function not provided" in the step D1, a well-known exchange process is implemented without changing "destination number information factor"(to step D4 from step D1 via the NO route).

According to the above-mentioned procedures, a call through the analog subscribers 301, the primary rate interface 30, the primary rate interface 40, and the analog subscriber 401 is established.

The above-mentioned "destination number information factor" can be defined on the subscriber data at the time of a subscriber data addition and changing operation.

A destination message received from the primary rate interface 30 can be substituted into an originating message after an establishment of the layer 2 logical link and then the destination telephone number can be varied. Hence even if an expensive primary rate interface device is not be actually connected to the primary rate interfaces 30 and 40, the layer 3 message transmitting and receiving process can be performed so that the B-channel can be tested economically and easily in the exchange apparatus.

Figure 8:
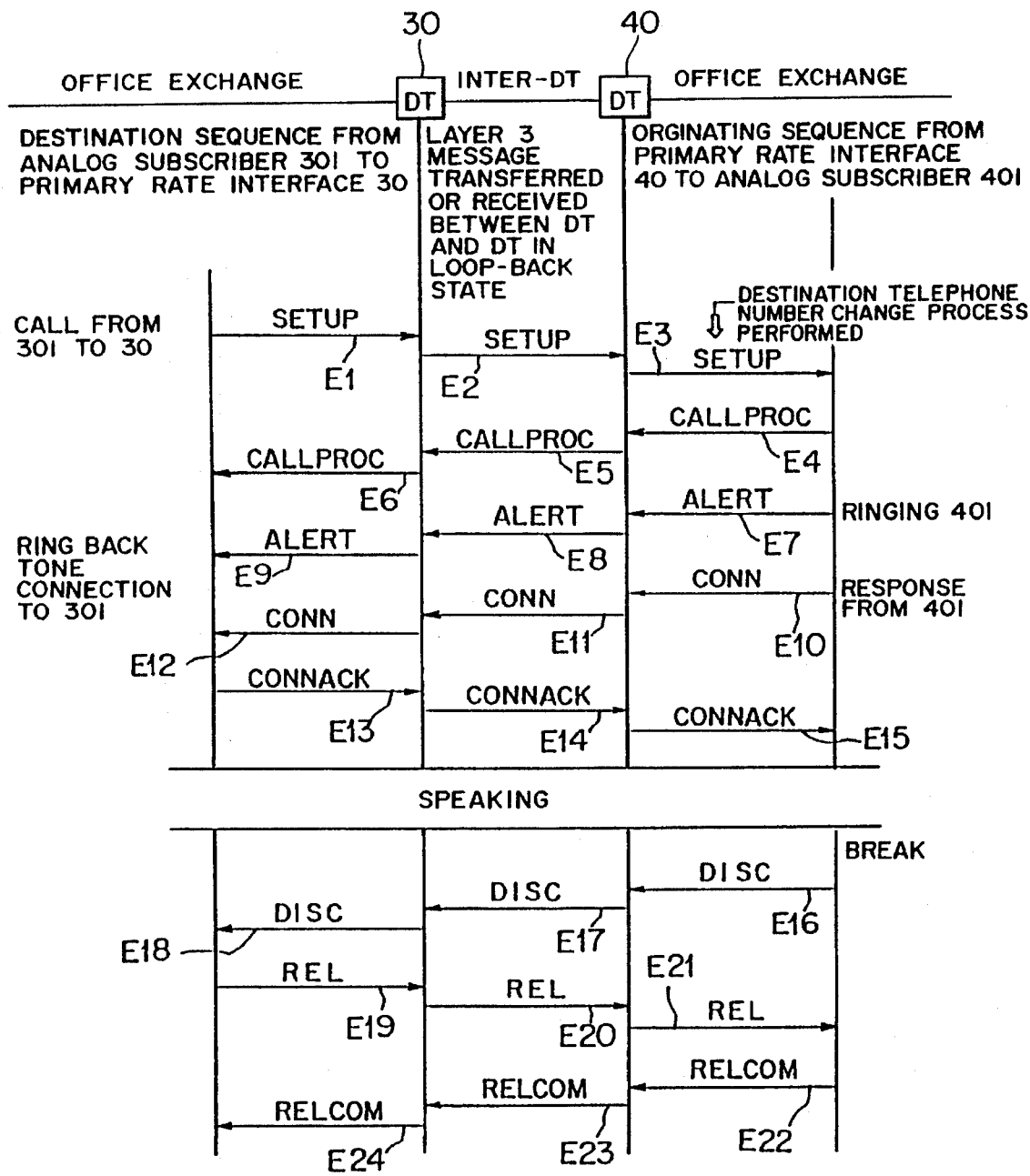
FIG. 8 is a transmission/reception sequence chart for the layer 3 massage in an exchange apparatus according to the first embodiment of the present embodiment.

FIG. 8 is a diagram showing the layer 3 message sequence between the office exchange 20 and the primary rate interfaces 30 and 40 in the loop-back connection state. As shown in FIG. 8, when the SETUP message originates from the primary rate interface 40 to the office exchange 20 (refer to the step E3 in the figure), the process that changes "destination number information factor" is performed. The detail explanation will be omitted here because other steps (steps E1, E2, E4 to E24) are well-known.

(c) Second Embodiment:

Next, the second embodiment of the present invention will be explained with reference to the attached drawings.

Figure 9:
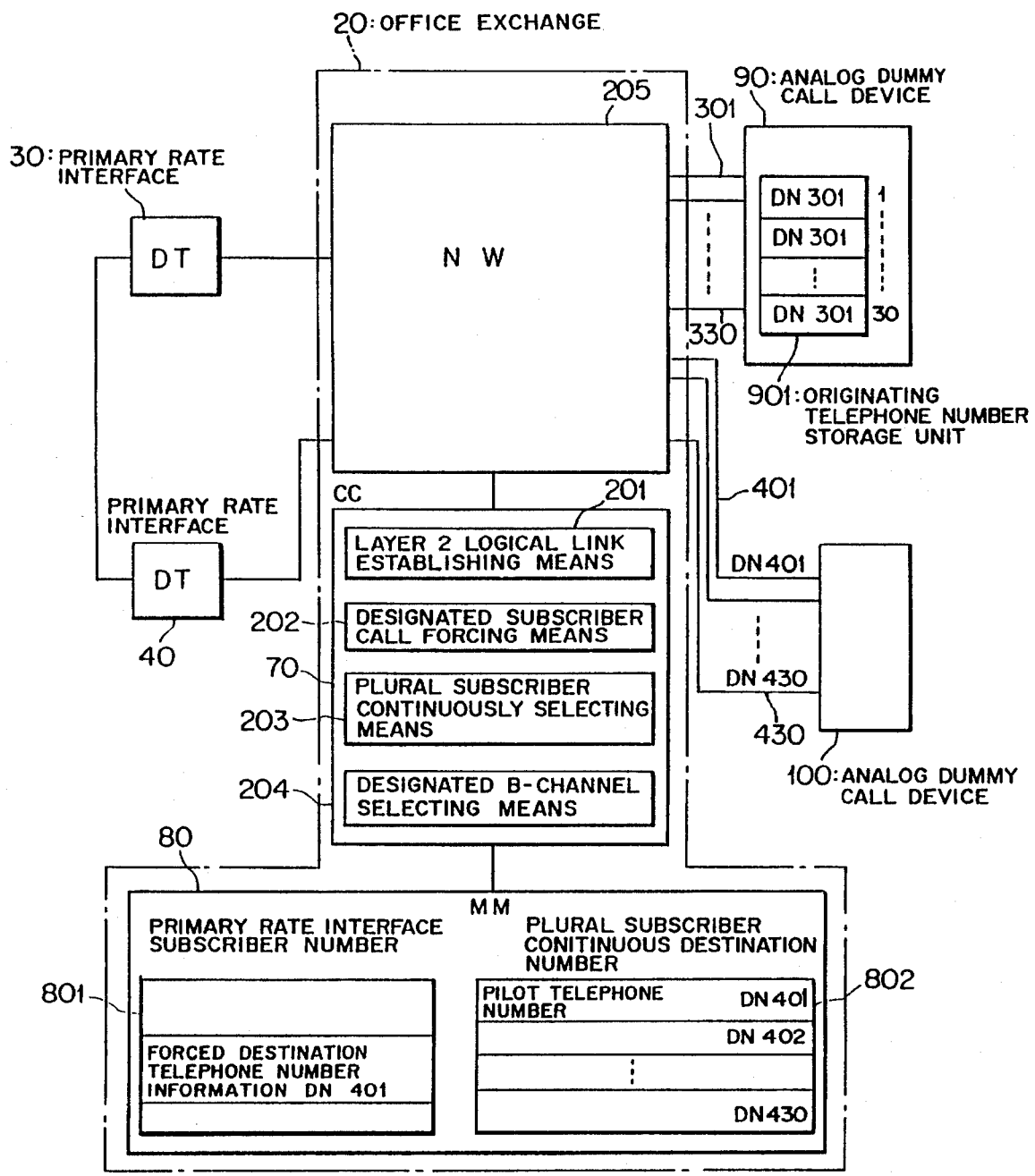
FIG. 9 is a block diagram illustrating the configuration of an exchange apparatus of the second embodiment of the present invention.

FIG. 9 is a block diagram showing the configuration of the exchange apparatus according to the second embodiment of the present invention. The exchange apparatus, as shown in FIG. 9, consists of the office exchange 20, and two primary rate interfaces (DT: digital terminals) 30 and 40 connected to the office exchange 20. The first primary rate interface 30 is connected to the primary rate interface 40 via the signal line (connecting means).

The exchange apparatus, as shown in FIG. 9, includes two analog dummy call devices 90 and 100 each being connectable up to 30 analog lines. The analog dummy call device 90 is connected to 30 subscribers including analog subscriber terminals 301 to 330 shown in FIG. 2 while the analog dummy call device 100 is connected to 30 subscribers including analog subscriber terminals 401 to 430 shown in FIG. 2. The analog dummy call device 90 connected to analog subscriber terminal 301 sets data in the originating telephone number memory device 901 in such a way that all the subscribers originate calls to the primary rate interface 30 with the telephone number DN301. In the analog dummy call device 100 connected to the analog subscriber terminal 401, all the subscribers are set to a destination call response.

The office exchange 20 is connected to the analog dummy call device 90 that functions as 30 analog originating subscriber terminals 301 to 330 (refer to FIG. 2), and the analog dummy call device 100 that functions as 30 destination subscriber terminals 401 to 430 (refer to FIG. 2).

The office exchange 20 includes a call path (NW: network) 205 same as that in the first embodiment, a central processing unit (CC) 70, and a main memory device (MM) 80. In the function of the present embodiment, the office exchange 20 includes layer 2 logical link establishing means 201, designated subscriber call forcing means 202, plural subscriber continuously selecting means 203, and designated B-channel selecting means 204. The main memory device 80 stores the subscriber data 801 of the primary rate interface 30 and plural-subscriber continuous destination call number table 802.

The plural-subscriber continuously selecting means 203 registers the telephone numbers DN401 to DN430 of all the subscribers including the analog subscriber terminal 401 to the analog subscriber terminal 430 in the plural-subscriber continuous destination call number table 802. When there is a destination call to the analog subscriber terminal 401 being busy, the plural-subscriber continuously selecting means 203 also selects continuously and terminates a specific subscriber of subscribers registered in the plural-subscriber continuous destination call number table 802, instead of terminating a destination call to the analog subscriber terminal 401.

In such a construction, 30 destination calls can be terminated to the analog subscriber terminal 401 through the same process as the process including the layers 1 to 3 described in the first embodiment.

Thereafter, like the first embodiment, the subscribers of the analog subscriber terminals 301 to 330 originate calls by simultaneously setting up two analog dummy call devices 90 and 100 so that destination calls to the analog subscriber terminals 401 to 430 through the primary rate interfaces 30 to 40 can be established. Hence, like the first embodiment, even if the analog subscriber terminals 301 to 330 and 401 to 430 are not actually connected, a load test of a digital subscriber can be performed using the analog dummy call devices 90 and 100.

As described above, since the analog dummy call device 90 can subject the primary rate interface 30 to a load test and the analog dummy call device 100 can subject the primary rate interface 40 to a load test, the load testing process becomes economical. Moreover, the call load test of the analog call process and the digital call process can be performed simultaneously and effectively.

(d) Others:

In the current method for supplementing the B-channel (control channel) in the office exchange 20, when a B-channel supplement request occurs, B-channels are retrieved for an empty B-channel (B-channel not assigned) from lower number to higher number and then the empty B-channel first found is supplemented.

Figure 10:
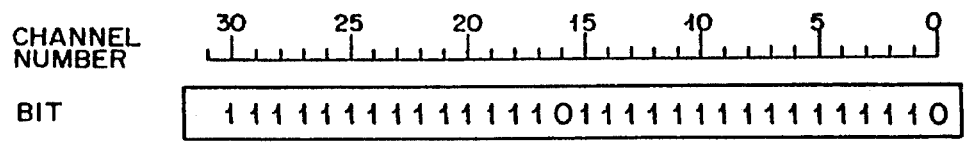
FIG. 10 is a diagram illustrating an example of the B-channel map used to explain the B-channel designating step in the exchange apparatus testing method according to the present invention.

In other words, in the case of the B-channel supplement, data of each subscriber called the B-channel map shown in FIG. 10 are retrieved from the first bit location to the thirtieth bit location, or from the thirtieth bit location to the first bit location. When an empty number (1: unassigned, in FIG. 10) is first found, it is used to supplement the B-channel. In this case, the bit location corresponds to the channel number.

In the exchange system, where testing all B-channels is intended by creating originating or destination calls through only the B-channel test procedure, 60(=30×2) analog subscriber terminals are needed. However, as described above, only B-channel bit is supplemented provided that only the B-channel bit to be used (or to be tested) is set (in this case, to "1") at the time of an subscriber data addition or change when dummy primary rate interface function information is added or a destination telephone number is changed. As a result, the B-channel number to be supplemented can be designated.

Figure 11:
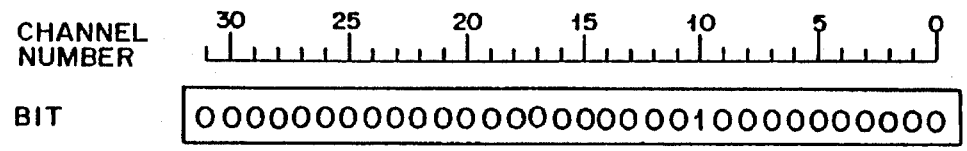
FIG. 11 is a diagram illustrating an example of the B-channel map used to explain the B-channel designating step in the exchange apparatus testing method according to the present invention.
Figure 12:
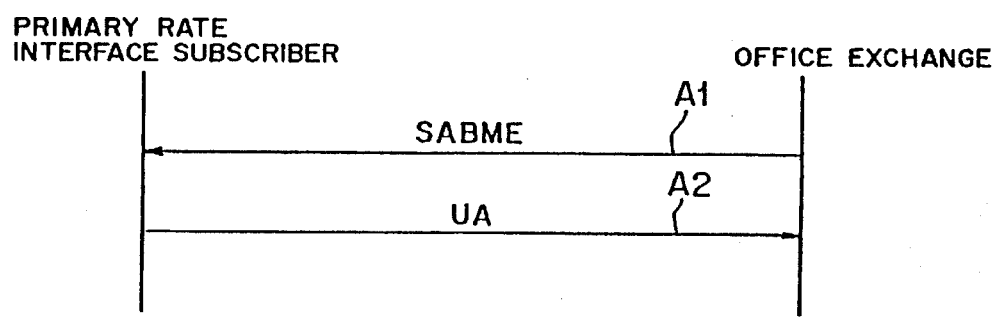
FIG. 12 is a sequence diagram used for explaining the procedure of establishing the layer 2 logical link.
Figure 13:
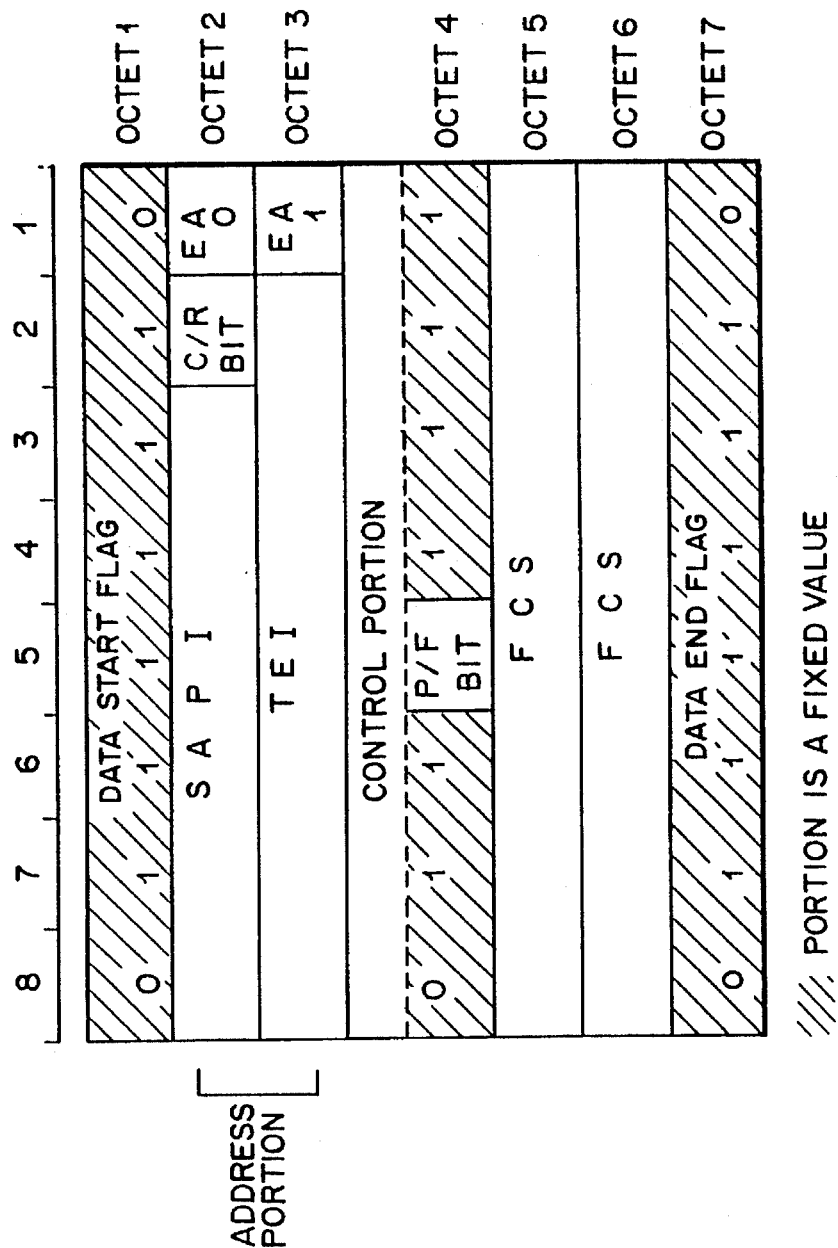
FIG. 13 is a diagram used for explaining the data configuration of SABME message swapped in the layer 2 logical link establishment.
Figure 14:
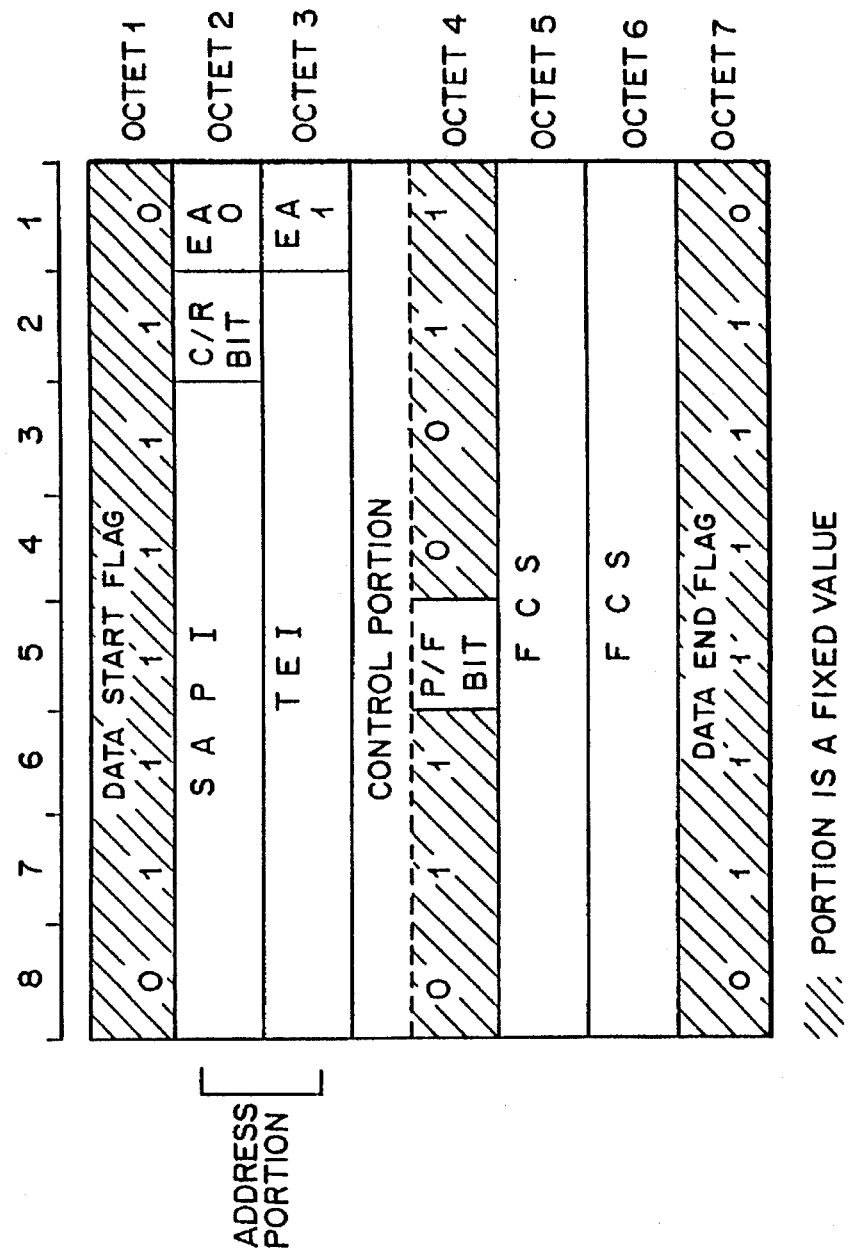
FIG. 14 is a diagram used for explaining the data configuration of UA message swapped in the layer 2 logical link establishment.
Figure 16:
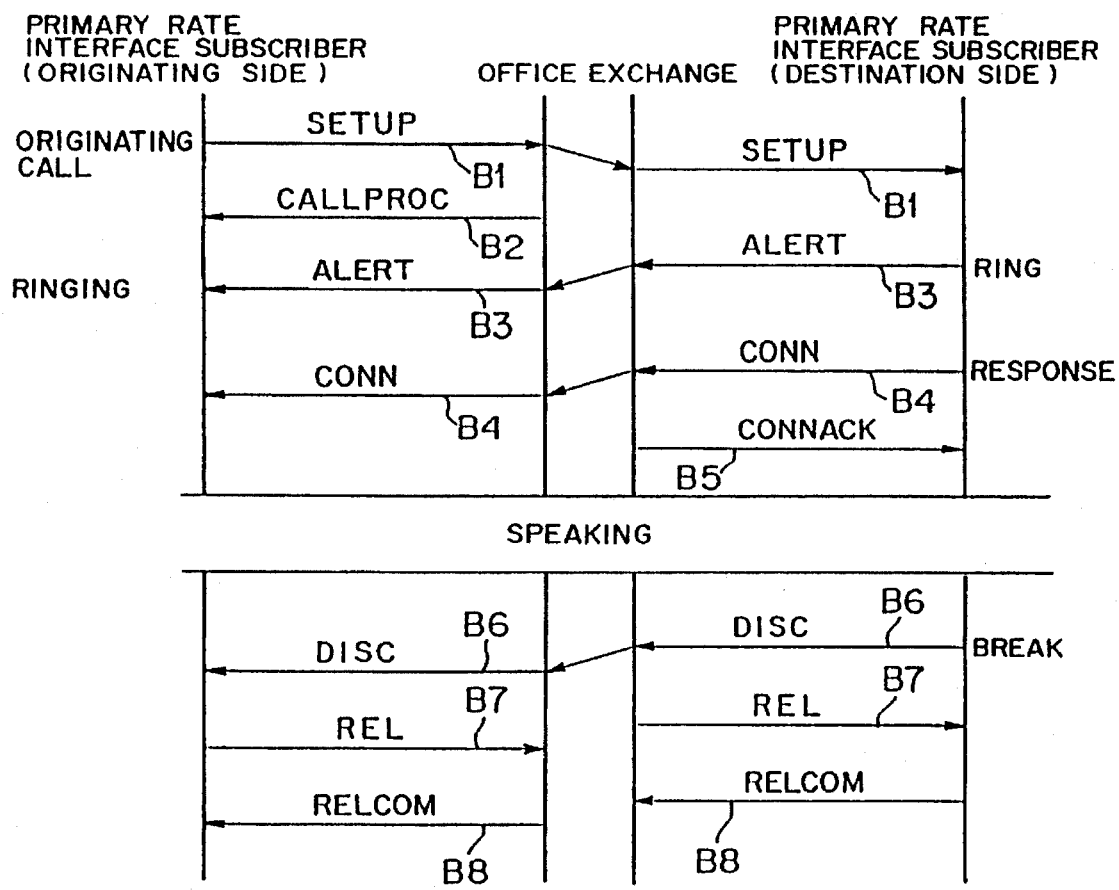
FIG. 16 is a sequence diagram used for explaining the procedure ranging from establishment to release of the B-channel speech signal path in response to transmission reception of a conventional layer 3 message.
Figure 17:
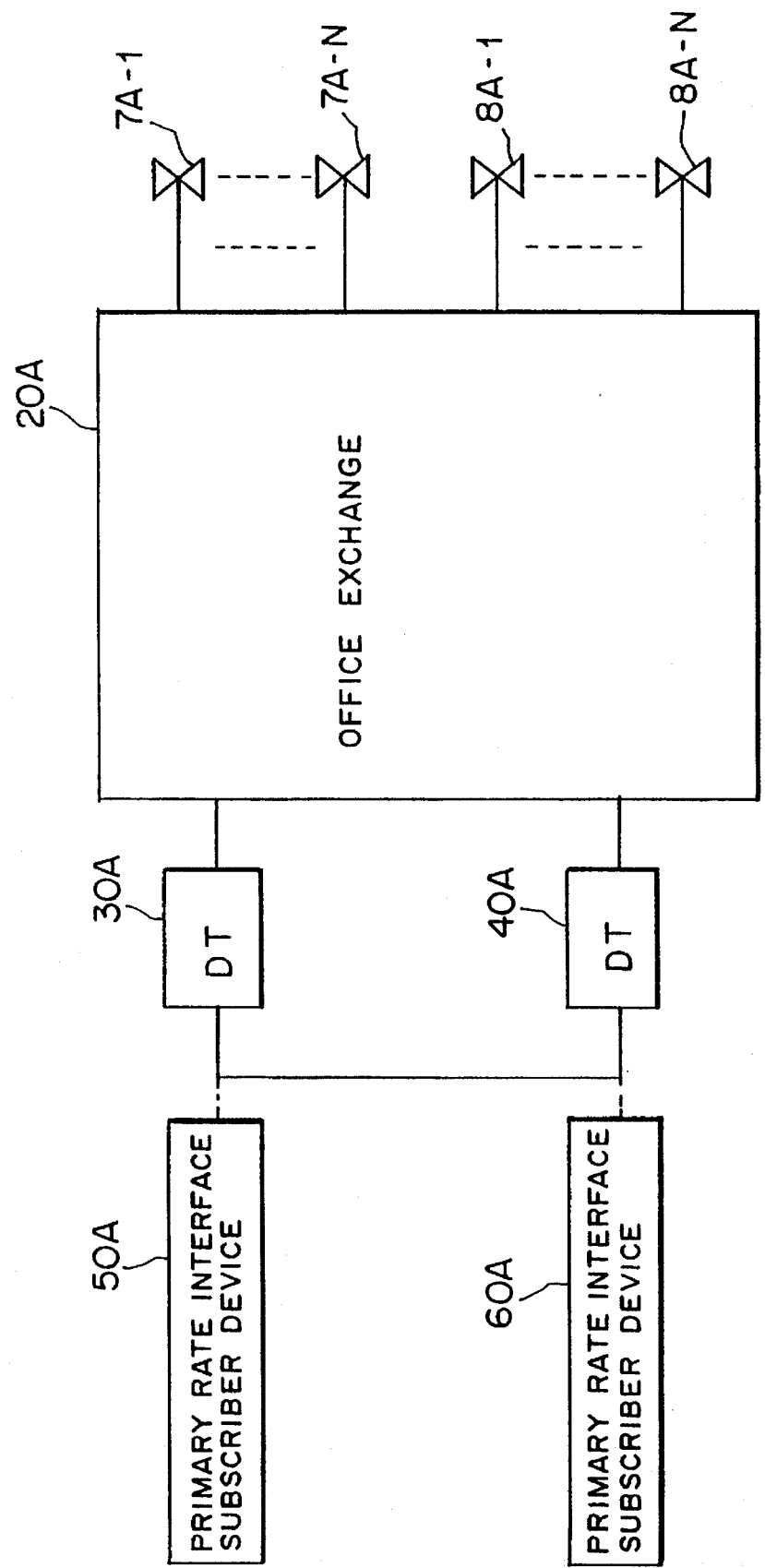
FIG. 17 is a block diagram illustrating the configuration of an exchange apparatus used to explain a conventional exchange apparatus testing method.

For example, where only the B-channel number "10" is designated to be supplemented, only the tenth bit, as shown in FIG. 11, is set (to"1") by the designated B-channel selecting means 204. Thus the B-channels other than the tenth B-channel becomes in use state so that the B-channel with the B-channel number 10 is supplemented in a dummy form. Hence where the above-mentioned exchange apparatus tested, testing can be made by designating the B-channel number.

As described above, since the B-channel to be tested can be designated, originating and destination calls can be regulated by restricting the B-channels which can be supplemented if a congestion state should occur in the office exchange 20.

What is claimed is:

1. An exchange apparatus including an exchange and two digital terminals connected to said exchange, comprising:

connecting means for physically interconnecting said digital terminals; and layer 1 process normality confirming means for confirming the normality of a layer 1 process to said digital terminals by said exchange while said connecting means interconnects physically said terminals;

said exchange including:

layer 2 logical link establishing means for inversely controlling command/response information during a logical link setting request after said layer 1 process normality confirming means has confirmed the normality of layer 1 process to said digital terminals in said exchange, and then for establishing a layer 2 logical link in said exchange, with said digital terminals physically connected in a loop-back state.

2. The exchange apparatus according to claim 1, wherein said layer 2 logical link establishing means comprising:

first judging means for judging whether said layer 1 process normality confirming means has confirmed the normality of a layer 1 process to said digital terminal in said exchange; and second judging means for judging whether said loop-back state exists based on the information defined in subscriber data after said first judgding means has confirmed the normality of said layer 1 process; and command/response information inverting means for reversing command/response information during said logical link setting request after said second judging means decides the presence of said loop-back state.

3. The exchange apparatus according to claim 1, wherein said exchange includes message substituting means that substitutes an originating message for a destination message received by said digital terminal.

4. The exchange apparatus according to claim 3, wherein said message substituting means includes destination telephone number changing means that changes a destination telephone number.

5. The exchange apparatus according to claim 1, wherein said exchange is connected to a first analog dummy call device that has plural analog originating subscriber terminal functions and a second dummy analog call device that has plural destination subscriber terminal functions; and wherein said exchange includes subscriber terminal continuously selecting means that selects continuously plural analog originating subscriber terminals and an analog destination subscriber terminal.

6. The exchange apparatus according to claim 1, wherein said exchange includes control channel designating means that designates a use control channel when an originating or a destination call is made.

7. An exchange apparatus testing method that tests an exchange apparatus including an exchange and two digital terminals connected to said exchange, comprising the steps of:

confirming the normality of a layer 1 process to digital terminals in said exchange, with said digital terminals physically interconnected;

then subjecting command/response information during a logical link setting request to a inverse control; and establishing a layer 2 logical link in said exchange, with said digital terminals physically interconnected in a loop-back state, whereby said exchange apparatus is tested.

8. The exchange apparatus testing method according to claim 7, further comprising the steps of:

substituting an originating message for a destination message received from said digital terminal after an establishment of said layer 2 logical link so that a destination telephone number is changed.

9. The exchange apparatus testing method according to claim 7, further comprising the step of:

selecting continuously plural analog originating subscriber terminals and plural analog destination subscriber terminals, with a first analog dummy call device with plural analog originating subscriber terminal functions and a second dummy call device with plural analog destination subscriber terminal functions connected to said exchange, whereby an exchange apparatus test is performed using said first analog dummy call device and said second dummy call device.

10. The exchange apparatus testing method according to claim 7, further comprising the step of:

designating a use control channel when an originating or destination call is made.

* * * * *